(12) United States Patent
Xie et al.

(10) Patent No.: US 9,645,448 B2
(45) Date of Patent: May 9, 2017

(54) DISPLAY PANEL, MANUFACTURING METHOD THEREOF AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jianyun Xie, Beijing (CN); Hailin Xue, Beijing (CN); Chuncheng Che, Beijing (CN)

(73) Assignees: BOE Technology Group Co., Ltd., Beijing (CN); Beijing BOE Optoelectronics Technology Co., Ltd., Beijing (CN)

(*) Notice: Subject to any disclaimer, the term of this patent is extended or adjusted under 35 U.S.C. 154(b) by 129 days.

(21) Appl. No.: 14/428,259

(22) PCT Filed: Jul. 30, 2014

(86) PCT No.: PCT/CN2014/083279
§ 371 (c)(1),
(2) Date: Mar. 13, 2015

(87) PCT Pub. No.: WO2015/085778
PCT Pub. Date: Jun. 18, 2015

(65) Prior Publication Data
US 2016/0011444 A1    Jan. 14, 2016

(30) Foreign Application Priority Data

Dec. 11, 2013  (CN) .......................... 2013 1 0673776

(51) Int. Cl.
*G02F 1/1339* (2006.01)
*G02F 1/1333* (2006.01)

(52) U.S. Cl.
CPC ........ *G02F 1/1339* (2013.01); *G02F 1/13394* (2013.01); *G02F 2001/133354* (2013.01)

(58) Field of Classification Search
CPC ............... G02F 1/1339; G02F 1/13394; G02F 2001/133354
(Continued)

(56) References Cited

U.S. PATENT DOCUMENTS 6,636,192 B1 * 10/2003 Saitoh ................... G02F 1/1339
345/87
7,405,798 B2 * 7/2008 Yoo ....................... G02F 1/1339
349/155
(Continued)

FOREIGN PATENT DOCUMENTS

CN    2906677 Y    5/2007
CN    202008564 U    10/2011
(Continued)

OTHER PUBLICATIONS

Sep. 2, 2015—(CN)—First Office Action Appn 201310673776.5 with English Tran.
(Continued)

*Primary Examiner* — Lucy Chien
(74) *Attorney, Agent, or Firm* — Banner & Witcoff, Ltd.

(57) ABSTRACT

A display panel, a manufacturing method thereof and a display device are provided. The display panel comprises: a first substrate and a second substrate which are opposite to each other to form a cell through a sealant. A first sealant-blocking structure configured to prevent the sealant from extending toward an edge of the display panel is formed on the first substrate and/or the second substrate. The display panel effectively prevents the sealant from extending toward the edge of the display panel by forming the first sealant-
(Continued)

blocking structure on an outside of the sealant, and hence achieves an ultra-narrow frame or unframed design.

15 Claims, 3 Drawing Sheets

(58) Field of Classification Search
 USPC .................................................. 349/153, 155
 See application file for complete search history.

(56) References Cited

U.S. PATENT DOCUMENTS

| | | |
|---|---|---|
| 2005/0041194 A1 | 2/2005 | Lee et al. |
| 2005/0238853 A1 | 10/2005 | Kim et al. |
| 2008/0116469 A1* | 5/2008 | Weng .................... G02F 1/1339 257/89 |
| 2010/0097560 A1* | 4/2010 | Ikeguchi ............... G02F 1/1339 349/155 |

FOREIGN PATENT DOCUMENTS

| | | |
|---|---|---|
| CN | 102253519 A | 11/2011 |
| CN | 102262319 A | 11/2011 |
| CN | 102636915 A | 8/2012 |
| CN | 102707509 A | 10/2012 |
| CN | 203365864 U | 12/2013 |
| CN | 103676337 A | 3/2014 |

OTHER PUBLICATIONS

Apr. 12, 2016—(CN)—Second Office Action Appn 201310673776.5 with English Tran.
Oct. 28, 2014—(WO) ISR—App. No. PCT/CN14/083279—with Eng Tran of Written Opinion.

* cited by examiner

DISPLAY PANEL, MANUFACTURING METHOD THEREOF AND DISPLAY DEVICE

The application is a U.S. National Phase Entry of International Application No. PCT/CN2014/083279 filed on Jul. 30, 2014, designating the United States of America and claiming priority to Chinese Patent Application No. 201310673776.5 filed on Dec. 11, 2013. The present application claims priority to and the benefit of the above-identified applications and the above-identified applications are incorporated by reference herein in their entirety.

TECHNICAL FIELD

At least one embodiment of the present disclosure relates to a display panel, a manufacturing method thereof and a display device.

BACKGROUND

Currently, mobile internet products are generally in pursuit of a narrow-frame or unframed design, and the size of frames of modules/panels is required to be increasingly reduced. The future trend is also an ultra-narrow frame or unframed design. In the current product design concept, the limitation for narrowing the frames mainly lies in the thinning of sealant and the control of position accuracy. In the current cutting process, the cutter wheel precision is smaller than or equal to (≤) 0.04 mm. Due to the extension of the sealant, when the sealant spills over and the cutting margin (distance) between the sealant and the frame cutting line (cutting line) of the display panel is smaller than 0.04 mm, poor cutting can be caused by the case that the sealant is cut by a cutter wheel of a cutter in the process of cutting the panel. As illustrated in FIG. 1, in order to prevent sealant 1 from extending toward the edge of the display panel in the process of sealing, the cutting margin C between the sealant 1 and the frame cutting line of the display panel is guaranteed to be greater than 0.2 mm.

SUMMARY

At least one embodiment of the present disclosure provides a display panel, a manufacturing method thereof and a display device to achieve the ultra-narrow frame design of the display device and reduce the fraction defective of cutting damage caused by the cutting of the sealant.

At least one embodiment of the present disclosure provides a display panel, which comprises: a first substrate and a second substrate which are opposite to each other to form a cell through a sealant. A first sealant-blocking structure configured to prevent the sealant from extending toward the edge of the display panel is formed on the first substrate and/or the second substrate.

At least one embodiment of the present disclosure further provides a method for manufacturing a display panel, which comprises the following steps: respectively forming a first sealant-blocking structure, configured to prevent sealant from extending toward the edge of the display panel, on a first substrate and/or a second substrate; and allowing the first substrate and the second substrate to be subjected to cell assembly and sealed by the sealant.

At least one embodiment of the present disclosure further provides a display device, which comprises the foregoing display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
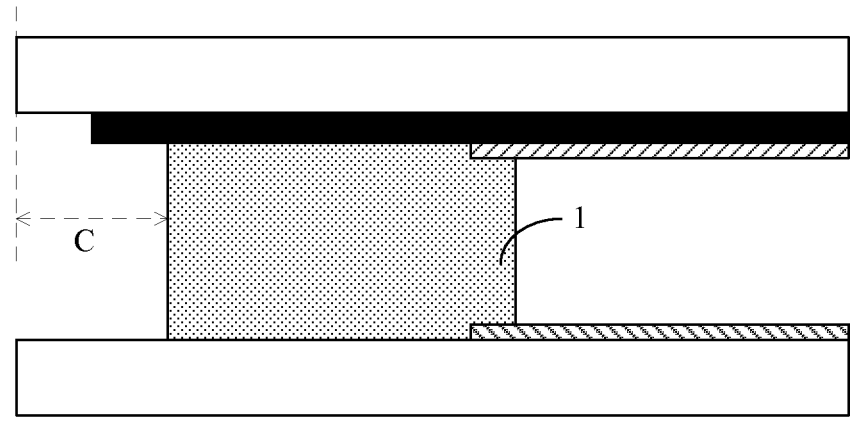
FIG. 1 is a schematic structural view of a sealant portion on a frame of a display panel.

The inventor of the application found that: as illustrated in FIG. 1, the cutting margin C of 0.2 mm between the sealant 1 and the frame cutting line of the display panel is the current design limit but still cannot satisfy the requirement for ultra-narrow frame and still has fraction defective of cutting damage caused by the cutting of the sealant.

Further detailed description will be given below to implementations of the present disclosure with reference to the accompanying drawings and the embodiments. The following embodiments are only intended to illustrate the present disclosure but not limitative to the scope of the present disclosure.

A display panel provided by at least one embodiment of the present disclosure comprises: a first substrate and a second substrate which are opposite to each other to form a cell through a sealant. A first sealant-blocking structure configured to prevent the sealant from extending toward an edge of the display panel is formed on the first substrate and/or the second substrate.

A sealant-blocking structure configured to prevent the sealant from extending toward the edge of the display panel is formed on the outside of the sealant, the sealant is effectively prevented from extending toward the edge of the display panel, so that the C value only needs to be not smaller than the cutter wheel precision (the cutter wheel precision ≤0.04 mm) of the cutter, and hence the ultra-narrow frame design can be achieved. Furthermore, the fraction defective of cutting damage caused by the cutting of the sealant can be reduced.

In an example, the first sealant-blocking structure can include: a first groove which is formed in a surface of the first substrate, facing the second substrate, and is corresponding to a non-display region; and a first protrusion formed in a region, corresponding to the first groove, on the second substrate. Namely a projection of the first protrusion on the first substrate overlaps a projection of the first groove on the first substrate (for instance, the projection of the first protrusion on the first substrate is within the range of the projection of the first groove on the first substrate). Both the first groove and the first protrusion are disposed on a side of the sealant, which side is close to the cutting line of the display panel. Description is given in the embodiment by taking the case that the first substrate is an array substrate and the second substrate is a color filter substrate as an example. When a color filter layer is formed on the array substrate, namely when the COA mode is adopted, the second substrate can be a transparent substrate.

Figure 2:
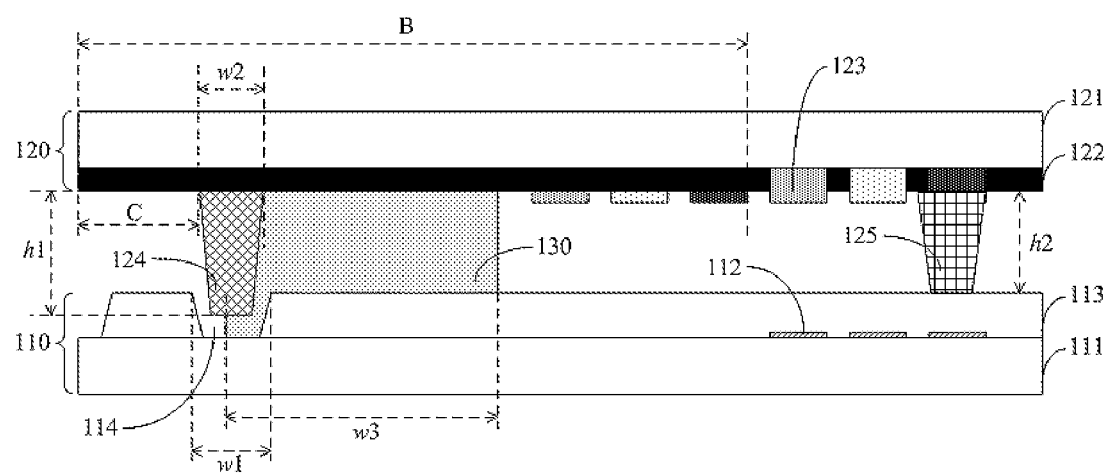
FIG. 2 is a schematic structural view of a display panel provided by an embodiment of the present disclosure.

For instance, the structure of the display pane can be as shown in FIG. 2, a pixel array 112 and an overcoat (protective layer) 113 are formed on a base substrate 111 of an array substrate 110. The overcoat 113 is generally disposed in the outermost layer of the array substrate 110. In a non-display region B, other functional layers such as a gate insulating layer and a passivation layer are generally disposed between the overcoat 113 and the base substrate 111. The overcoat 113 covers the pixel array 112. A black matrix 122 and a color filter 123 are formed on a base substrate 121 of a color filter substrate 120. The array substrate 110 and the color filter substrate 120 are opposite to each other to form a cell (namely, are cell-assembled) through a sealant 130, so that liquid crystals are sealed in the formed liquid crystal cell. In order to effectively prevent the sealant 130 from extending toward the edge of the display panel so as to obtain a narrow frame, a first groove 114 is formed in the overcoat 113 on a surface of the array substrate 110, facing the color filter substrate 120, and is corresponding to the non-display region B; correspondingly, a first protrusion 124 is formed in a region, corresponding to the first groove 114, on the color filter substrate 120; and both the first groove 114 and the first protrusion 124 are disposed on a side of the sealant 130, which side is close to the cutting line of the display panel.

During the cell assembly (before the sealant is solidified), the first protrusion 124 prevents the sealant that is not solidified from extending toward the edge of the display panel to a certain degree, and meanwhile, the first groove 114 can accommodate a part of the sealant that is not solidified and extends to the edge of the display panel, so the sealant 130 can be effectively prevented from extending toward the edge of the display panel. Thus, the value of the cutting margin C between the first protrusion 124 and the cutting line on the edge only needs to be not smaller than the cutter wheel precision of a cutter (the cutter wheel precision ≤0.04 mm). The minimum C value can be 0.05 mm. Compared with the value of 0.2 mm as shown in FIG. 1, the frame can be narrower, and hence the ultra-narrow frame or unframed design can be achieved. Because the sealant 130 is prevented from extending toward the edge of the display panel, the sealant 130 may extend toward the interior of the display panel, may even extend to a display region, and hence pollute the liquid crystals and result in poor peripheral image quality. But the first groove 114 can accommodate a part of the sealant 130, so the sealant 130 is prevented from extending toward the interior of the display panel to a certain degree.

In an example, spacers 125 configured for supporting a cell gap can also be formed between the array substrate 110 and the color filter substrate 120. The spacers are generally formed on the color filter substrate 120 and can also be formed on the inside of the sealant 130. In an example, in order to more effectively prevent the sealant 130 from extending toward the edge of the display panel, as illustrated in FIG. 2, the height h1 of the first protrusion 124 is greater than the height h2 of the spacer 125, and the width w1 of the first groove 114 is greater than the width w2 of the first protrusion 124. Thus, the height of the first protrusion 124 is greater than the cell gap, and can be embedded into the first groove 114, and hence the degree of preventing the sealant 130 from extending toward the edge of the display panel can be enhanced. Moreover, after the first protrusion 124 is embedded into the first groove 114, the first groove 114 still has certain space therein to accommodate the sealant 130, and further prevents the sealant 130 from extending toward the interior of the display panel to a certain degree. In order to ensure the ultra-narrow frame or unframed design, it is not suitable that the width w1 of the first groove 114 is too wide. For instance, the width w1 of the first groove can be 50 μm.

In an example, the range that the height of the first protrusion 124 exceeds that of the spacer is from 0 to H, and the H is smaller than the thickness of the array substrate 110 and is not 0. For instance, the H can be the thickness of the overcoat 113 or the sum of the thickness of the overcoat 113 and the thicknesses of other functional layers. For instance, the height of the first protrusion 124 exceeds that of the spacer by 0.05 μm. At this point, H is greater than or equal to (≥) 0.05 μm, so that the first protrusion 124 can be embedded into the first groove 114 and the first groove 114 can be also guaranteed to have space large enough to accommodate the sealant 130.

In the embodiment, the C value can be as small as possible, as long as the C value is greater than the cutter wheel precision of the cutter. For instance, the C value can be 0.05 mm, so that the frame can be narrower. In various examples, the width w3 of the sealant 130 can also be controlled to be from 0.35 mm to 0.6 mm (e.g., 0.55 mm), so that the frame can be narrower.

Figure 3:
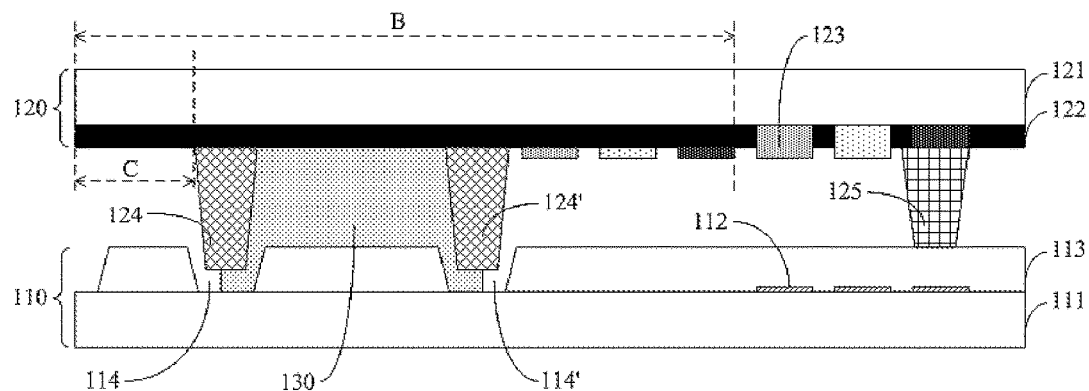
FIG. 3 is a schematic structural view of another display panel provided by an embodiment of the present disclosure.

In an example, in order to more effectively prevent the sealant 130 from extending toward the interior of the display panel and obtain a narrower frame, a second sealant-blocking structure configured to prevent the sealant from extending toward the interior of the display panel can also be formed on the array substrate and/or the color filter substrate. For instance, as illustrated in FIG. 3, a second groove 114' can also be formed in the overcoat 113 on the surface of the array substrate 110 facing the color filter substrate 120 and be corresponding to the non-display region B; correspondingly, a second protrusion 124' is formed in a region, corresponding to the second groove 114', on the color filter substrate 120; and both the second groove 114' and the second protrusion 124' are disposed on the inside of the sealant 130. The cooperative relationship between the second groove 114' and the second protrusion 124' is similar to the cooperative relationship between the first groove 114 and the first protrusion 124. Detailed description will be omitted herein. The formed second groove 114' and the second protrusion 124' can also bring more accurate control of the width of the sealant 130.

For the convenience of manufacturing, the second sealant-blocking structure has a shape and a size the same as the first sealant-blocking structure. For instance, the size of the second groove 114' is the same as the size of the first groove 114, and the shape and the size of the second protrusion 124' are the same as the shape and the size of the first protrusion 124.

At least one embodiment of the present disclosure further provides a method for manufacturing the above-mentioned display panel, and the method comprises: forming a first sealant-blocking structure, configured to prevent a sealant from extending toward an edge of the display panel, on a first substrate or a second substrate, or a first substrate and a second substrate respectively; and opposing the first substrate to the second substrate to form a cell through the sealant. For instance, an example of the method can comprise the following steps.

Figure 4:
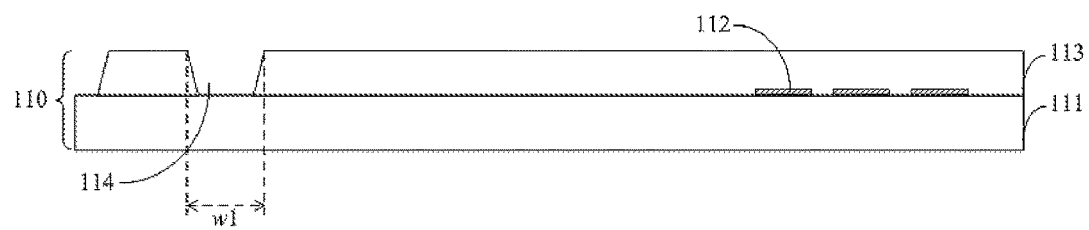
FIG. 4 is a schematic structural view illustrating a process of forming a groove on an array substrate in a method for manufacturing a display panel, provided by an embodiment of the present disclosure.

Step 1: manufacturing a first substrate, forming an overcoat on a surface of the first substrate, and forming a first groove in a region of the overcoat, corresponding to a non-display region. As illustrated in FIG. 4, an array substrate 110 is manufactured; a pixel array 112 corresponding to a display region is formed on a base substrate 111; an overcoat 113 is formed on the pixel array 112; and a first groove 114 is formed in a region of the overcoat 113, corresponding to a non-display region. The first groove 114 can be formed by using a mask process.

Figure 5:
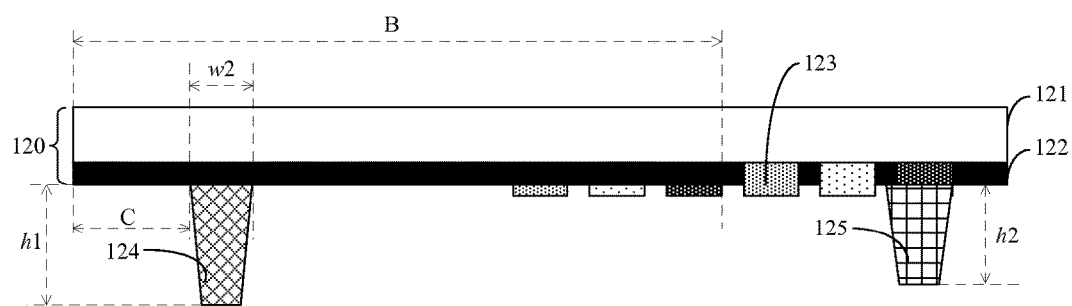
FIG. 5 is a schematic structural view illustrating a process of forming a protrusion on a color filter substrate in a method for manufacturing a display panel, provided by an embodiment of the present disclosure.

Step 2: manufacturing a second substrate and forming a first protrusion in a region of a surface of the second substrate, corresponding to the non-display region. As illustrated in FIG. 5, a color filter substrate 120 is manufactured; a black matrix 122 and a color filter 123 are formed on a base substrate 121 of the color filter substrate 120; and a first protrusion 124 is formed in a region of a surface of the color filter substrate 120 (e.g., a surface of the black matrix 122), corresponding to the non-display region B. The first protrusion 124 can be formed by using a mask process.

Figure 6:
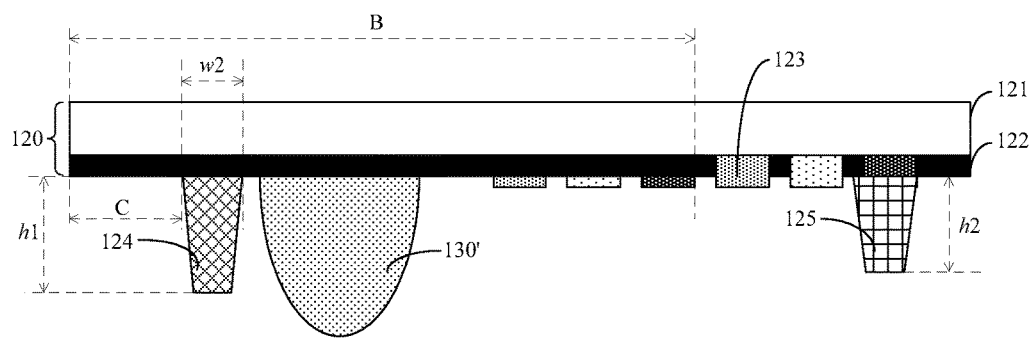
FIG. 6 is a schematic structural view illustrating a process of coating a sealant that is not solidified on the basis of the color filter substrate illustrated in FIG. 5.

Step 3: opposing the first substrate to the second substrate to form a sealed cell through a sealant, so that the region provided with the first protrusion corresponds to the region provided with the first groove, and after cell assembly, both the first protrusion and the first groove are disposed on an outside of the sealant. As illustrated in FIG. 6, before cell assembly, a sealant 130' that is not solidified is formed on the color filter substrate in a region corresponding to the non-display region B. The sealant 130' that is not solidified is formed on the inside of the first protrusion 124. During the cell assembly, the region provided with the first protrusion 124 corresponds to the region provided with the first groove 114. After the cell assembly, both the first protrusion 124 and the first groove 114 are disposed on the outside of the sealant 130. A first sealant-blocking structure is formed by the first groove 114 and the first protrusion 124 together.

During the cell assembly (before the sealant is cured), the first protrusion 124 prevents the sealant 130' that is not solidified from extending toward the edge of the display panel to a certain degree, and meanwhile, the first groove 114 can accommodate a part of the sealant 130' that is not solidified and extends toward the edge of the display panel, so the sealant 130 can be effectively prevented from extending toward the edge of the display panel. Thus, the value of the cutting margin C between the first protrusion 124 and the cutting line on the edge only needs to be not smaller than the cutter wheel precision of a cutter (the cutter wheel precision ≤0.04 mm). Therefore, after the cell assembly, the ultra-narrow frame or unframed display panel as shown in FIG. 2 is finally formed.

In the embodiment of the present disclosure, the sequence of the step 1 and the step 2 is not limited. The first substrate and the second substrate can also be manufactured at the same time and hence are subjected to the cell assembly in the step 3.

In one example, in order to more effectively prevent the sealant 130 from extending toward the edge of the display panel, in the process of manufacturing the color filter substrate 120, the method provided by an embodiment of the present disclosure can further comprise the step of forming spacers 125, configured for supporting a cell gap, on the color filter substrate 120, so that the height h1 of the first protrusion 124 is greater than the height h2 of the spacer 125 and the width w1 of the first groove 114 is greater than the width w2 of the first protrusion 124. In order to ensure the ultra-narrow frame or unframed design, it is not suitable that the width w1 of the first groove 114 is too wide. For instance, the width w1 of the first groove 114 can be 50 μm.

In an example, the range that the height of the first protrusion 124 exceeds that of the spacer is from 0 to H, and the H is smaller than the thickness of the array substrate 110 and is not 0. For instance, the H can be equal to the thickness of the overcoat 113 or the sum of the thickness of the overcoat 113 and the thicknesses of other functional layers. For instance, the height of the first protrusion 124 exceeds that of the spacer by 0.05 μm. At this point, H is greater than (≥) 0.05 μm, so that the first protrusion 124 can be embedded into the first groove 114 and the first groove 114 can be also guaranteed to have enough large space to accommodate the sealant 130.

In the embodiment, before the cell assembly, when the sealant 130' that is not solidified is formed on the color filter substrate 120 in a region corresponding to the non-display region B, for instance, the maximum width of the sealant 130' that is not solidified can be from 0.2 mm to 0.4 mm (e.g., 0.3 mm). Thus, during the cell assembly, the sealant 130' that is not solidified is cured, so that the width of the cured sealant 130 can be from 0.35 mm to 0.6 mm (e.g., 0.55 mm). In the embodiment, the C value can be as small as possible as long as the C value is greater than the cutter wheel precision of the cutter. For instance, the C value can be 0.05 mm, so that the frame can be narrower.

In an example, in order to more effectively prevent the sealant 130 from extending toward the interior of the display panel and obtain a narrower frame, before the cell assembly, a second sealant-blocking structure configured to prevent the sealant from extending toward the interior of the display panel is formed on the first substrate or the second substrate, or on the first substrate and the second substrate respective. In an example, in the process of manufacturing the array substrate 110, a second groove 114' can also be formed in the overcoat 113 of the array substrate and in a region corresponding to the non-display region B; correspondingly, in the process of manufacturing the color filter substrate 120, a second protrusion 124' is formed in a region, corresponding to the second groove 114', on the color filter substrate 120; and both the second groove 114' and the second protrusion 124' are disposed on the inside of the sealant 130. The cooperative relationship between the second groove 114' and the second protrusion 124' is similar to the cooperative relationship between the first groove 114 and the first protrusion 124. Detailed description is omitted herein.

For the convenience of manufacturing, the second sealant-blocking structure has a shape and a size the same as the first sealant-blocking structure. For instance, the size of the second groove 114' is the same as the size of the first groove 114, and the shape and the size of the second protrusion 124' are the same with the shape and the size of the first protrusion 124.

Figure 7:
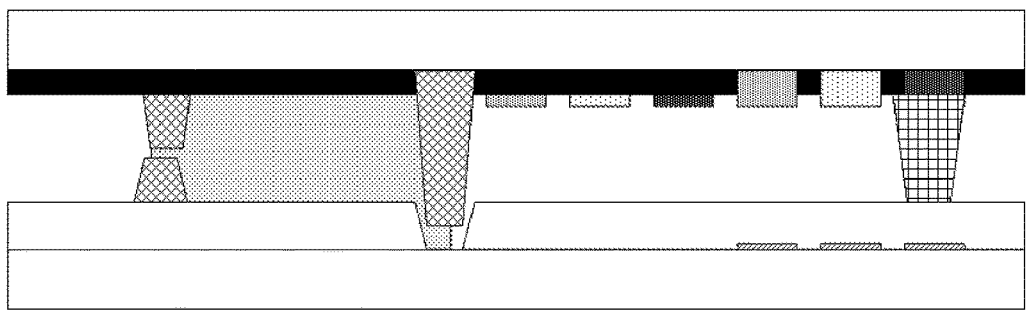
FIG. 7 is a schematic structural view of a sealant-blocking structure of still another display panel provided by an embodiment of the present disclosure.

The first sealant-blocking structure and the second sealant-blocking structure in the embodiments of the present disclosure are not limited to a pair of cooperative groove and protrusion structures in the above embodiments, but can include one or a combination of the concave structure and the protrusion structure. The concave structure can be formed in the first substrate and/or the second substrate. The protrusion structure can be formed on the first substrate and/or the second substrate. For instance, the first sealant-blocking structure and the second sealant-blocking structure can also be protrusions formed in the non-display region on the first substrate; or protrusions formed in the non-display region on the second substrate; or protrusion structures formed in respective non-display regions on the first substrate and the second substrate; or concave structures formed in respective non-display regions in the first substrate and/or the second substrate; or a combined structure of a concave structure and a protrusion structure. Of course, the first sealant-blocking structure and the second sealant-blocking structure can be different. In the sealant-blocking structures as shown in FIG. 7, the first sealant-blocking structure is a structure including an upper protrusion and a lower protrusion and is configured to prevent the sealant from extending toward the edge of the display panel; and the second sealant-blocking structure is a structure including an upper protrusion and a lower groove and is configured to prevent the sealant from extending toward the interior of the display panel. Due to the sealant-blocking structures, the ultra-narrow frame or unframed design is guaranteed and the sealant cannot extend to edges of liquid crystals inside the display panel.

At least one embodiment of the present disclosure further provides a display device. The display device comprises the above-mentioned ultra-narrow frame or unframed display panel. The display device can be any product or component with display function such as a liquid crystal display panel, an e-paper, a mobile phone, a table computer, a television, a display, a laptop, a digital picture frame and a navigator.

The above embodiments are only intended to illustrate the present disclosure but not limitative to the present disclosure. Various variations and modifications can also be made by those skilled in the art without departing from the spirit and scope of the present disclosure. Therefore, all the equivalent technical proposals shall also fall within the scope of the present disclosure. The scope of the present disclosure shall be defined by the appended claims.

The application claims the benefit of Chinese Patent Application No. 201310673776.5, filed on Dec. 11, 2013, which is hereby entirely incorporated by reference as a part of the present application.

What is claimed is:

1. A display panel, comprising: a first substrate and a second substrate which are opposite to each other to form a cell through a sealant, wherein a first sealant-blocking structure configured to prevent the sealant from extending toward an edge of the display panel is formed on the first substrate and/or the second substrate, the first sealant-blocking structure comprises a first protrusion or a first groove formed on the first substrate, and a second protrusion or a second groove formed on a region of the second substrate, which corresponds to the first protrusion or the first groove formed on the first substrate, wherein the first sealant-blocking structure comprises: the first groove which corresponds to a non-display region and is formed in a surface of the first substrate, facing the second substrate, and second protrusion formed in a region, corresponding to the first groove, on the second substrate; and both the first groove and the first protrusion are disposed on a side of the sealant, which side is closer to a cutting line of the display panel than an opposite side of the sealant, and wherein a spacer configured to support a cell gap is formed between the first substrate and the second substrate; a height of the first protrusion is greater than that a height of the spacer; and a width of the first groove is greater than a width of an entirety of the first protrusion.

2. The display panel according to claim 1, wherein the width of the first groove is 50 μm.

3. The display panel according to claim 1, wherein a range that the height of the first protrusion exceeds the height of the spacer is from 0 to H, and the H is smaller than a thickness of the first substrate and is not equal to 0.

4. The display panel according to claim 3, wherein the height of the first protrusion exceeds that of the spacer by 0.05 μm; and the H is greater than or equal to 0.05 μm.

5. The display panel according to claim 1, wherein a width of the sealant is from 0.35 mm to 0.6 mm.

6. The display panel according to claim 1, wherein a cutting margin between the first protrusion and the cutting line of the display panel is not smaller than 0.05 mm.

7. The display panel according to claim 1, wherein a second sealant-blocking structure configured to prevent the sealant from extending toward an interior of the display panel is provided on the first substrate and/or the second substrate.

8. The display panel according to claim 7, wherein the second sealant-blocking structure comprises at least one selected from the group consisting of a concave structure and a protrusion structure.

9. The display panel according to claim 8, wherein where the second sealant-blocking structure comprises a combination of the concave structure and the protrusion structure, the second sealant-blocking structure comprises: a third groove which corresponds to a non-display region and is formed in a surface of the first substrate, facing the second substrate, and a third protrusion formed in a region, corresponding to the third groove, on the second substrate; and both the third groove and the third protrusion are disposed on the opposite side of the sealant.

10. The display panel according to claim 7, wherein the second sealant-blocking structure has a shape and a size the same as the first sealant-blocking structure.

11. A method for manufacturing a display panel, comprising: forming a first sealant-blocking structure, configured to prevent a sealant from extending toward an edge of the display panel, on a first substrate or and a second substrate, wherein the first sealant-blocking structure comprises a first protrusion or a first groove formed on the first substrate, and a second protrusion or a second groove formed on a region of the second substrate, which corresponds to the first protrusion or the first groove formed on the first substrate; and opposing the first substrate to the second substrate to form a sealed cell through the sealant, wherein forming the first sealant-blocking structure comprises: manufacturing the first substrate, and forming the first groove in a surface of the first substrate and in a region corresponding to a non-display region; and manufacturing the second substrate, and forming the second protrusion on a surface of the second substrate and in a region corresponding to the non-display region, so that the region provided with the first protrusion corresponds to the region provided with the first groove, and after cell assembly, the first protrusion and the first groove are arranged opposite to each other and disposed on a side of the sealant, which side is closer to a cutting line of the display panel than an opposite side of the sealant, and the first groove and the first protrusion form the first sealant-blocking structure together, and wherein the manufacturing the second substrate further comprises: forming a spacer configured to support a cell gap on the second substrate, so that a height of the first protrusion is greater than a height of the spacer and a width of the first groove is greater than a width of an entirety of the first protrusion.

12. The method for manufacturing the display panel according to claim 11, wherein a range that the height of the first protrusion exceeds that of the spacer is from 0 to H, and the H is smaller than a thickness of the first substrate and is not equal to 0.

13. The method for manufacturing the display panel according to claim 11, before cell assembly and sealing, further comprising:

forming a second sealant-blocking structure, configured to prevent the sealant from extending toward an interior of the display panel, on the first substrate or the second substrate, or on the first substrate and the second substrate respectively.

14. A display device, comprising a display panel according to claim 1.

15. A display panel, comprising: a first substrate and a second substrate which are opposite to each other to form a cell through a sealant, wherein a first sealant-blocking structure configured to prevent the sealant from extending toward an edge of the display panel is formed on the first substrate and/or the second substrate, and the first sealant-blocking structure comprises at least one selected from the group consisting of a concave structure and a protrusion structure;

wherein in the case of the first sealant-blocking structure comprises a combination of the concave structure and the protrusion structure, the first sealant-blocking structure comprises: a first groove which corresponds to a non-display region and is formed in a surface of the first substrate, facing the second substrate, and a first protrusion formed in a region, corresponding to the first groove, on the second substrate; and both the first groove and the first protrusion are disposed on a side of the sealant, which side is closer to a cutting line of the display panel than an opposite side of the sealant, and wherein a spacer configured to support a cell gap is formed between the first substrate and the second substrate; a height of the first protrusion is greater than that a height of the spacer; and a width of the first groove is greater than a width of an entirety of the first protrusion.

* * * * *